United States Patent [19]

De Freitas

[11] 4,440,328
[45] Apr. 3, 1984

[54] WIDE-MOUTHED ISOTHERMAL CONTAINER WITH INTEGRATED HANDLE EQUIPPED WITH IMMERSED PUMP

[75] Inventor: Elias M. De Freitas, Gomes, Brazil

[73] Assignee: Termolar S/A, Porto-Alegre-RS, Brazil

[21] Appl. No.: 342,987

[22] Filed: Jan. 26, 1982

[51] Int. Cl.³ .............................................. B67D 5/40
[52] U.S. Cl. .................................... 222/538; 222/538; 222/385; 220/94 A
[58] Field of Search ............... 222/385, 383, 382, 372, 222/131, 153, 129, 182, 402.11–402.13, 536–538, 533, 544, 556, 401, 207; 220/94 R, 94 A

[56] References Cited

U.S. PATENT DOCUMENTS

| 1,918,903 | 7/1933 | Fletcher | 222/385 |
| 2,514,147 | 7/1950 | Thomes . | |
| 2,514,773 | 7/1950 | Kromer | 222/538 |
| 2,880,914 | 4/1959 | Lerner et al. | 222/536 |
| 2,893,612 | 7/1959 | Akens | 222/536 |
| 3,152,729 | 10/1964 | Piker | 222/533 |
| 3,905,520 | 9/1975 | Nishioka | 222/209 |
| 4,113,147 | 9/1978 | Frazier et al. | 222/131 |
| 4,116,366 | 9/1978 | Takenakashima et al. | 222/131 |
| 4,125,207 | 11/1978 | Ernst et al. | 222/538 |
| 4,174,053 | 11/1979 | Shimaza | 222/209 |
| 4,238,054 | 12/1980 | Chen | 222/131 |
| 4,274,562 | 6/1981 | Medeiros et al. | 222/401 |
| 4,290,537 | 9/1981 | Jung | 222/25 |
| 4,300,705 | 11/1981 | Shy | 222/131 |
| 4,310,104 | 1/1982 | Takatsuki | 222/131 |
| 4,320,856 | 3/1982 | Stewart et al. | 222/131 |
| 4,320,859 | 3/1982 | Shy | 222/536 |
| 4,344,548 | 8/1982 | Frazier | 222/209 |

FOREIGN PATENT DOCUMENTS 576978 3/1958 Italy .................................. 220/94 A Primary Examiner—Joseph J. Rolla
Assistant Examiner—Kenneth Noland
Attorney, Agent, or Firm—Beveridge, DeGrandi & Kline

[57] ABSTRACT

An improved isothermal jug-like container is shown which is well adapted to the coupling of a pouring pump. The pump is installed asymmetrically so that the pump spout, when in the pouring position, projects itself outwards. The entire pump is protected by the handle when the spout is in the "closed" position.

8 Claims, 2 Drawing Figures

WIDE-MOUTHED ISOTHERMAL CONTAINER WITH INTEGRATED HANDLE EQUIPPED WITH IMMERSED PUMP

The present invention relates to a new wide-mouthed isothermal container, eccentrically placed in relation to its external body onto which a mechanical device of manual operation is attached, in order to transfer liquids from this container without the need of inclining it or introducing compressed air into it; this mechanical device itself was the subject of Brazilian Pat. No. PI 8100430 corresponding to U.S. application Ser. No. 339,547 filed Jan. 15, 1982, now issued. Due to the new dispositions and construction forms of the container, the difficulty of adapting a serving pump in a wide mouthed and large volume container, of more or less equal width and height, has been solved. The bottles known to date which have serving pumps, are preferably tall, slender and of limited capacity.

The fact that the container has a wide mouth, enables a perfect cleaning which is not the case with other existing devices. For its handle a shape was developed in such a way that in addition to its aesthetic appeal has great strength, further improved by the reinforcement obtained by filling it with expanded plastic foam.

This handle provides easy transportation of the container and at the same time protects the pump set located under it. With the newly developed construction, the pump is positioned eccentrically causing the pouring spout, whenever in serving position, to be projected outwards from the container, whereas in a closed and locked position, the pouring spout is protected under the handle.

Since the bottom of the inner container is of large size, the problem of pouring the entire contents was solved by a cylindrical depression in the bottom.

The isothermal container of the invention is insulated with polyurethane foam or a similar material and is described below in its preferred aspect, when considered together with the accompanying drawings wherein.

Figure 1:
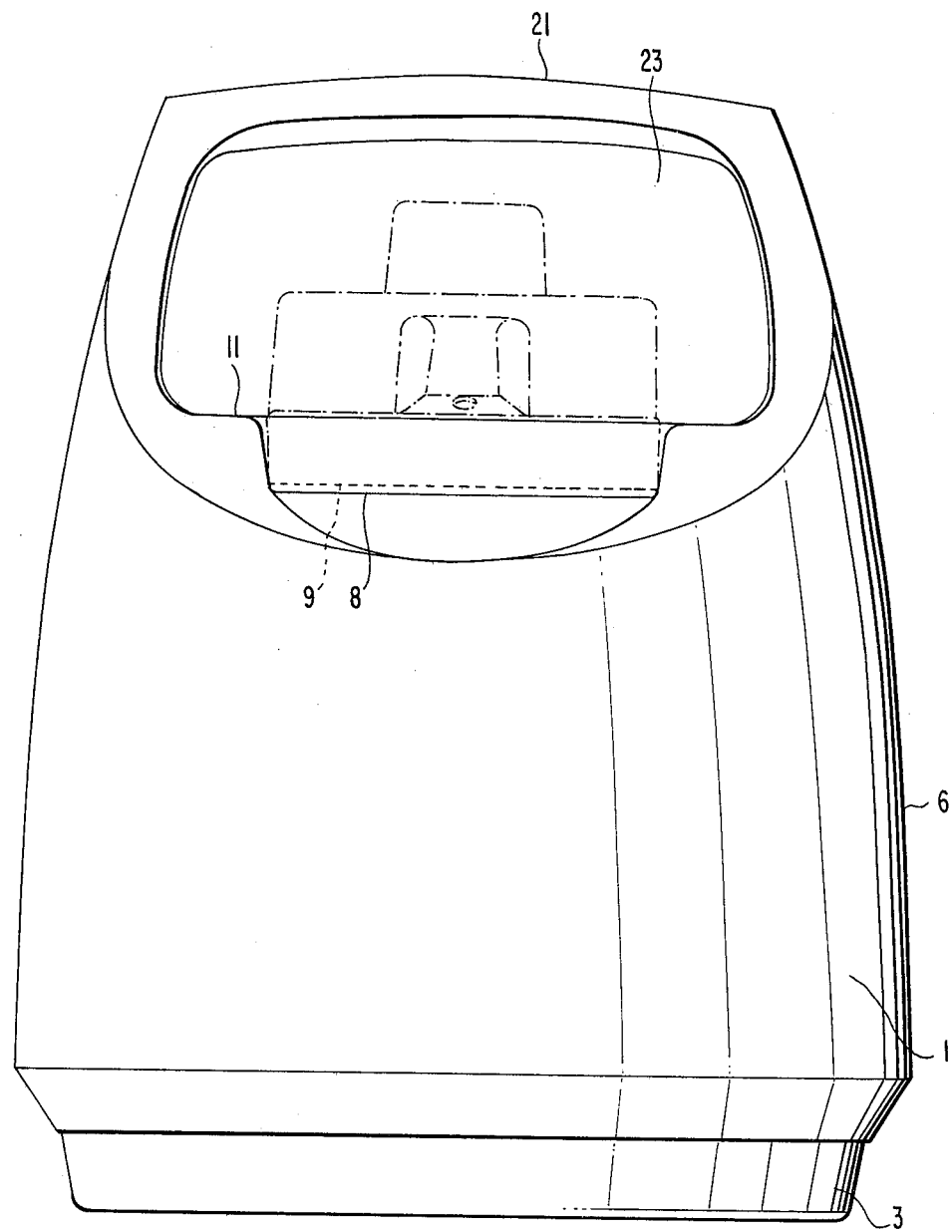
FIG. 1 is a front elevational view of the container of the invention.

The container itself is composed of an outer case (1), an inner container (19), a bottom (3) and a pump (13). The inner container neck is fixed by two rims (17) forming a groove which clamps in the passage opening (7) of the outer case (1), being positioned and fastened to it through the filling of polyurethane (20) which has also the purpose of thermally insulating the set.

The inner container (19) has a neck (16) with an external screw-thread or bayonet (22) onto which the pump's upper body (13) is fitted. In the outer case, the passage opening (7) for the neck (16) of the inner container (19) is positioned asymmetrically in relation to the vertical axis of the container, in such a way that the pump (13), attached to this neck has its pouring spout (14) projected outwards from the external case (1).

The inner container (19) has conical side walls and a cylindrical depression (4) in the bottom, in relation to the mouth of the neck (16) already mentioned.

In order to obtain maximum resistance, the shape of the set is such that the outer case (1) is limited, laterally by a surface of revolution which is generated as a composed curve (6), having in its lower end another truncated cone surface (2) with its lesser diameter turned downwards, and prolonging itself by a threaded conical baseboard (5). The surface of revolution is limited in the upper part by two curved surfaces (10) of horizontal generation and parabolical direction; these surfaces are symmetrical in relation to a plane which goes through the vertical axis of the body (1). These two surfaces at the highest point of the container become tangent to two equidistant and parallel planes to the vertical plane, previously mentioned, being intercepted and limited, in the upper part, by a convex surface (21). The slim projection thus obtained is opened, leaving an empty space (23), determining the formation of a integrated handle which has its upper and side inner walls rounded while its lower part is formed by an horizontal plane (11).

Figure 2:
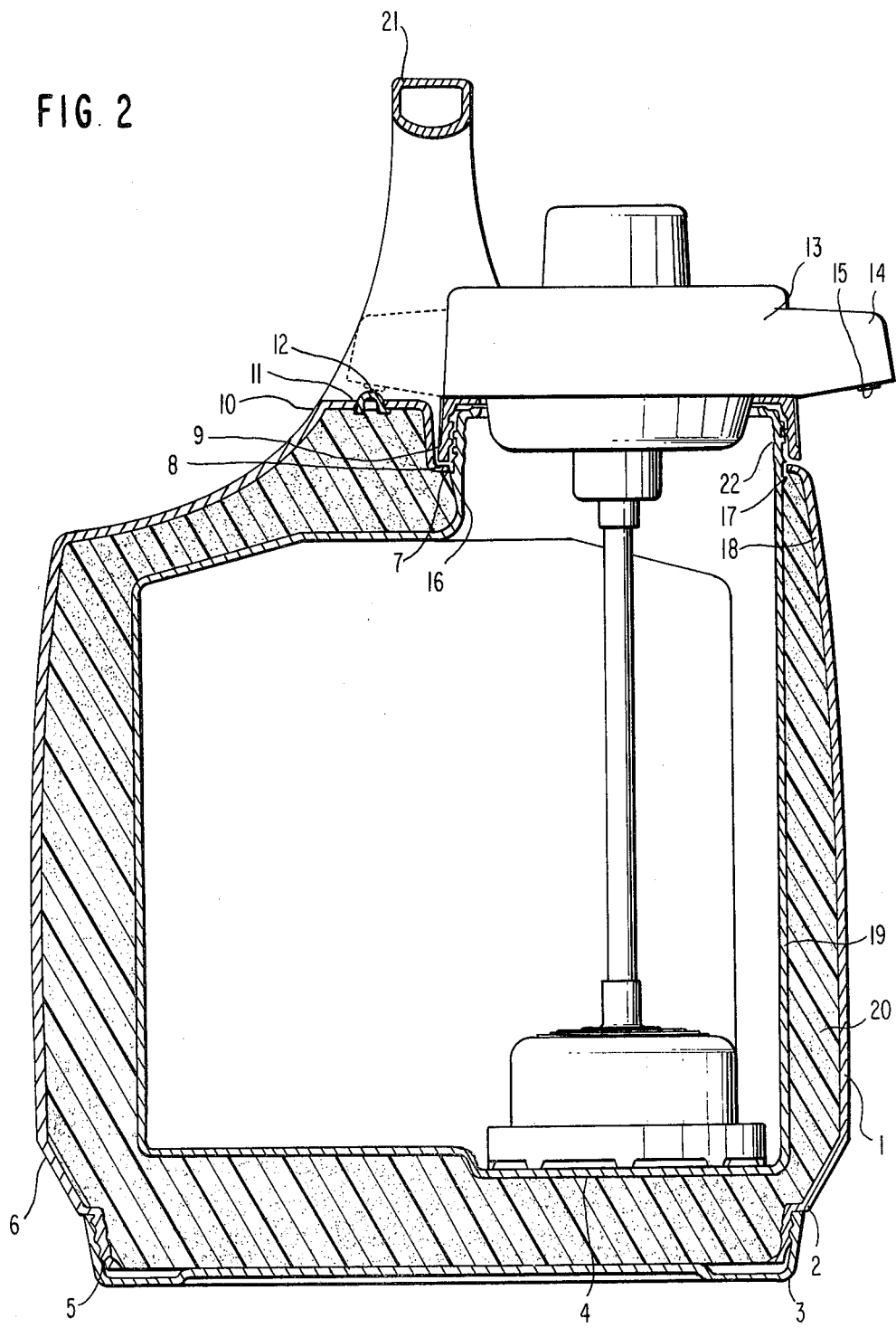
FIG. 2 is a cross-sectional side view of the container of the invention.

This horizontal plane has a semi-cylindrical depression (9) displaced forwards in relation to the container axis. The horizontal surface (8) of the bottom of this lowering is prolonged forwards, being limited sideways by a cylindrical projection (18) which rises from the curved surface (6). In this lowering, placed outside the center in relation to the axis of the container, there is a circular passage opening (7) FIG. 2, to the edge of which is fixed, through the corresponding clamp rims (7) of the neck (16), the inner container (19), so that the pump adapted to the neck (16) is fitted to this semi-cylindrical (9) lowering.

Under these conditions, the spout of this pump is projected outwards when turned into the "serve" position and remaining closed and protected by the handle when turned rearwards, in the locked position, as the outer case (1) has in its rear part of the horizontal plane (11) a hemispherical hump (12) which blocks the outlet (15) of this spout (14). When the container is resting on a horizontal surface, the spout is easily turned to the frontal position where it stays projected outwards. It will only be necessary then to press the button in order to activate the pump to serve the desired quantity of cold or hot liquid, as this kind of pump is self-pumping proof.

The outer container has a base (3) of a conical side wall which is threaded to the conical baseboard (5) of the outer case (1), a threaded, conical fixture being selected to solve the assembly problem of having the base separated and after, tightly fastened when the injected polyurethane is expanded.

It should be well understood that the elements herein described are only given as examples; their shapes, dimensions and materials can be changed without deviating from the basic concept of the invention described herein. This is partly determined by the shape of the thermal container to be used. The model therefore must be generally considered in the terms of what has been stated above. Variations and modifications thereof will be apparent to those skilled in the art from the foregoing and are intended to be encompassed by the claims appended hereto.

I claim:

1. A wide-mouthed isothermal container having an integrated handle equipped with an immersed pump comprising an outer case (1) having curved side walls (6); and a curved upper wall (10) of a horizontal section and a parabolic section; a bottom portion (3); a circular passage opening (7) in said upper wall; said horizontal section of said upper wall further having a semi-cylindrical depression and a horizontal surface (8) at the bottom of said semi-cylindrical depression; a handle (21) integral with said outer case and enclosing an empty space (23); the said horizontal section of said upper wall forming a horizontal plane (11) and provided with a hump (12); a pump (13) fitted to said container, said pump being mounted at said circular passage opening and positioned in the semi-cylindrical depression, whereby, the pump is mounted eccentrically to the central vertical axis of the container so that a spout of the pump projects outwardly from the outer case when the spout is in a pouring position; said spout having (14) an outlet (15) adapted to engage said hump (12) when the spout is rotated to a non pouring position.

2. The wide-mouthed isothermal container in accordance with claim 1, further comprising an inner container (19) having side walls and a bottom and a neck portion (16) and inserted into said outer container (1), there being an empty space between the walls of the inner and outer container, said space being filled with an expanded insulating plastic foam (20), the inside bottom of said inner container having a cylindrical depression (4); the neck (16) of said inner container having two rims (17) forming a groove, said neck portion having means (22) for attaching said pump.

3. The wide-mouthed isothermal container in accordance with claim 2, wherein the curved side walls of the outer case have a truncated conical lower section (2).

4. The wide-mouthed isothermal container in accordance with claim 2, further comprising said neck (16) being eccentric with respect to the vertical axis of symmetry of the container thereby allowing the pouring spout (14) and its outlet (15) to project outwards from the side wall of the outer container when the container is in pouring position.

5. The wide-mouthed isothermal container in accordance with claim 2, wherein said pump includes attachment means including threaded or bayonet means for attachment to said neck portion (16).

6. The wide-mouthed isothermal container in accordance with claim 2, further comprising a cylindrical depression (4) in the bottom of the inner container (19) under the neck portion (16), for total emptying of the contents thereof.

7. The wide-mouthed isothermal container in accordance with claim 1, further comprising said handle (21) being integrated into the body of the container in a parabolic shape which is an extension of the parabolic portion of the upper wall of said outer container, said pump being adapted to rotate in a horizontal plane (11) to position the spout (14) within the empty space (23) defined by said handle (21).

8. The wide-mouthed isothermal container in accordance with claim 1, further comprising the bottom (3) being attached to the outer case (1) by screw-threaded means.

* * * * *